United States Patent [19]
Wan et al.

[11] Patent Number: 5,452,112
[45] Date of Patent: Sep. 19, 1995

[54] COLOR IMAGE REPRODUCTION SYSTEM FIELD CALIBRATION METHOD AND APPARATUS

[75] Inventors: Shijie Wan, Rochester; Anthony J. Leone, Pittsford, both of N.Y.

[73] Assignee: Eastman Kodak Company, Rochester, N.Y.

[21] Appl. No.: 217,782

[22] Filed: Mar. 25, 1994

[51] Int. Cl.$^6$ .................. H04N 1/00; H04N 1/46; G03F 3/08
[52] U.S. Cl. ................... 358/504; 358/518; 358/406
[58] Field of Search ............ 358/501, 504, 505, 515, 358/518, 519, 520, 525, 527, 534, 535, 538, 406; 355/214, 208

[56] References Cited

U.S. PATENT DOCUMENTS

| | | | |
|---|---|---|---|
| 4,941,038 | 7/1990 | Walowit | 358/504 |
| 5,053,866 | 10/1991 | Johnson | 358/504 |
| 5,107,332 | 4/1992 | Chan | 358/80 |
| 5,185,673 | 2/1993 | Sobol | 358/518 |
| 5,309,256 | 5/1994 | Takada et al. | 358/504 |
| 5,335,096 | 8/1994 | Shimazaki | 358/504 |
| 5,339,176 | 8/1994 | Smilansky et al. | 358/504 |

OTHER PUBLICATIONS

Hewlett Packard, "Using the HP ScanJet IIc Scanner with Microsoft Windows", Nov. 1992, pp. 3–34.
Candela, Ltd., "Candela Color Separation Technology, GCR Description", 1992.
Apple Computer, Inc., "Color OneScanner and OneScanner-User's Guide", 1992.

*Primary Examiner*—Edward L. Coles, Sr.
*Assistant Examiner*—Kimberly A. Williams
*Attorney, Agent, or Firm*—Thomas H. Close

[57] ABSTRACT

A method of calibrating a color image reproduction system in the field is provided. The color image reproduction system includes a color input scanner for generating a color digital image, a digital image processor for applying a color transform to the color digital image to produce a transformed color digital image and, and a digital color printer for printing the transformed color digital image. The calibration method includes the steps of: a) providing a set of calibration tools developed on a representative system, the tools including a scanning target, a first reference file recording the response of a scanner to the scanning target in the representative system, an image file for producing a test pattern, and a second reference file recording the response of the scanner in the representative system to the test pattern printed on the printer in the representative system; and b) employing the calibration tools to calibrate the color image reproduction system in the field, by: 1) scanning the scanning target in the color scanner to produce a first test file; 2) employing the first test file and the first reference file, to generate a scanner calibration table; 3) sending the image file to the color printer to produce a second test pattern; 4) scanning the second test pattern in the color scanner and processing the output of the color scanner through the scanner calibration table to produce a second test file; and 5) employing the second test file and the second reference file to generate a printer calibration table.

5 Claims, 4 Drawing Sheets

COLOR IMAGE REPRODUCTION SYSTEM FIELD CALIBRATION METHOD AND APPARATUS

FIELD OF THE INVENTION

The invention relates generally to the field of color image reproduction, and more particularly to a method and apparatus for calibrating, in the field, a color image reproduction system of the type employing a digital color input scanner, a digital image processor, and a digital color output printer.

BACKGROUND OF THE INVENTION

Typically, a color image reproduction system, as shown in FIG. 1, includes a color scanner 20, a digital image processing computer 22, and a color printer 24. The scanner 20 scans a color image to produce a color digital image usually expressed in a red, green, and blue (RGB) color coordinate system. The digital image processing computer 22, which may be a general purpose digital computer or a special image processing computer, transforms the RGB digital image to a form that can be used by the printer 24, such as a cyan, magenta, and yellow (CMY) digital image. Often the printer 24 will also have black printing capability, and the digital image signal sent to the printer will include a black component K (CMYK). The digital image processing computer 22 also performs any desired color balance or tone scale adjustments to the digital image, and performs calibration corrections for the individual properties of the scanner, the printer and the print media used in the printer. All of these adjustments, corrections and calibrations are usually performed based on a look-up table in the digital image processing computer 22 that executes a transform on the digital color image.

It is well known in the art that once such a digital image reproduction system has been set up to perform satisfactorily (for example in the factory), the performance of the components may drift or the properties of the print media may change, thereby necessitating the need for periodic calibration in the field. One representative prior art approach to calibrating a color image reproduction system in the field is disclosed in U.S. Pat. No. 5,107,332 issued Apr. 21, 1992 to Chan.

The method employed by Chan is illustrated schematically in FIG. 2. Initially, a transform $F_{old}$ is generated in the factory, which fully calibrates the color image reproduction system. This transform 26 is stored in the image processing computer 22. Later, in the field, when the system needs to be recalibrated, a sample test pattern 28 supplied by the manufacturer (called $TP_{in}$) is scanned and processed through the system to produce an output test pattern 30 (called $TP_{out}$). The digital image RGB produced by the scanner 20 when the test pattern is scanned is temporarily stored. The output test pattern 30 is then scanned by the scanner 20 to produce a second digital image RGB', which is also temporarily stored. The two stored digital images RGB and RGB' are then used to generate a matrix H (32) relating $TP_{in}$ to $TP_{out}$. The matrix H is then employed to update (34) the transform $F_{old}$ to produce a new transform $F_{new}$ 36. Finally, the old transform ($F_{old}$) is replaced in the computer 22 with the new transform ($F_{new}$). This system color calibration is able to calibrate color reproduction systems in which the input images to the system and the output images from the system are printed on the same media (e.g. the same paper stock using the same dye or ink set as the original). In general, this method is not applicable to color reproduction systems in which the input and output images are printed on different media. This is because a scanner senses color differently from the way in which the human eye sees color. Two color patches printed on different media which appear the same to the human eye may be sensed differently by a scanner, and vice versa. For this reason, a color reproduction system which is calibrated based on an input target $T_{in}$ and an output target $T_{out}$ of the same media using the same dye sets may not improve color reproduction for input images on different media using different dye sets. For example, when the input to the color image reproduction system is a traditional photographic color print and the printer of the system is a thermal color printer using thermal paper and a thermal dye set, the prior art method of calibration will not be totally effective.

SUMMARY OF THE INVENTION

The present invention is directed to overcoming one or more of the problems set forth above. More particularly, it is an object of the present invention to provide a general field calibration technique for color image reproduction systems that will work when the input and output images are printed on different types of media. Briefly summarized, according to one aspect of the present invention, a method of calibrating a color image reproduction system in the field is provided. The color image reproduction system includes a color input scanner for generating a color digital image, a digital image processor for applying a color transform to the color digital image to produce a transformed color digital image, and a digital color printer for printing the transformed color digital image. The calibration method includes the steps of: a) providing a set of calibration tools developed on a representative system, the tools including a scanning target, a first reference file recording the response of the scanner in the representative system to scanning the first target, an image file for producing a test pattern on a printer, and a second reference file recording the response of the scanner of the representative system to scanning a test pattern produced on the printer in the representative system; and b) employing the calibration tools to calibrate the color image reproduction system, by: 1) scanning the scanning target in the scanner to produce a first test file; 2) employing the first test file and the first reference file, to generate a scanner calibration table; 3) sending the image file to the printer to produce a test pattern; 4) scanning the test pattern in the scanner and processing the output of the scanner through the scanner calibration table to produce a second test file; and 5) employing the second test file and the second reference file to generate a printer calibration table.

The present invention has a number of advantages. It can be easily performed in the field by the system operator, and requires no additional instruments such as densitometers. The invention has the further advantage that when employed with a mass produced image reproduction system, only one representative system needs to be initially fully calibrated to generate a color transform (look-up table) that can be identically used in all the systems, thereby realizing substantial manufacturing savings. Furthermore, when a component such as a scanner, printer, or media is replaced in the field, the entire system does not need to be fully recalibrated but can be calibrated using the method of the present invention.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The invention is described below with reference to the drawings, where similar parts are indicated by the same part numbers.

DETAILED DESCRIPTION OF THE INVENTION

Figure 1:
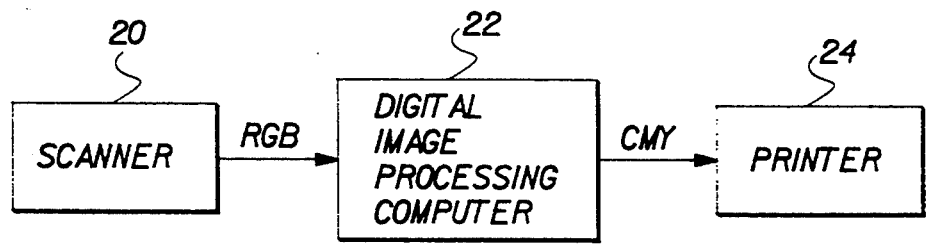
FIG. 1 is a schematic diagram illustrating a color image reproduction system useful in practicing the present invention.
Figure 2:
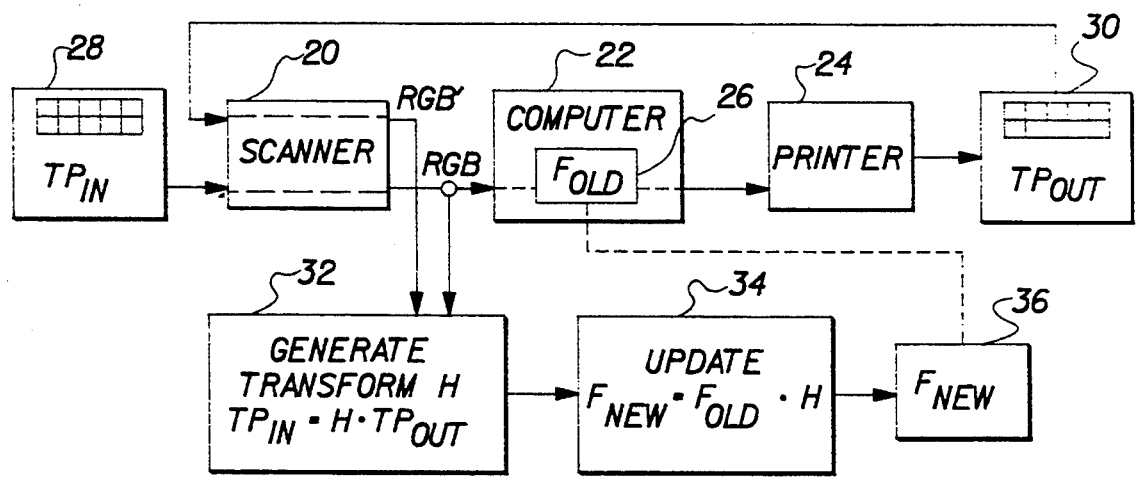
FIG. 2 is a schematic diagram illustrating a prior art method of calibrating a color image reproduction system in the field using the same type of input and output media.
Figure 4:
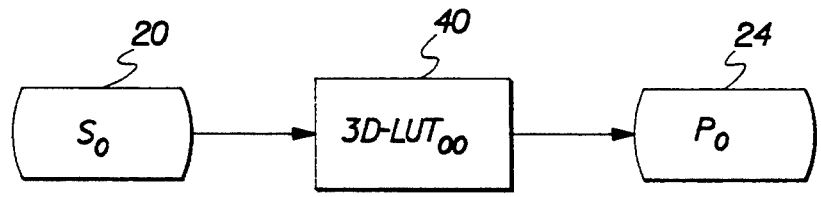
FIG. 4 is a schematic diagram illustrating a factory reference color image reproduction system employed in the method of the present invention.
Figure 3:
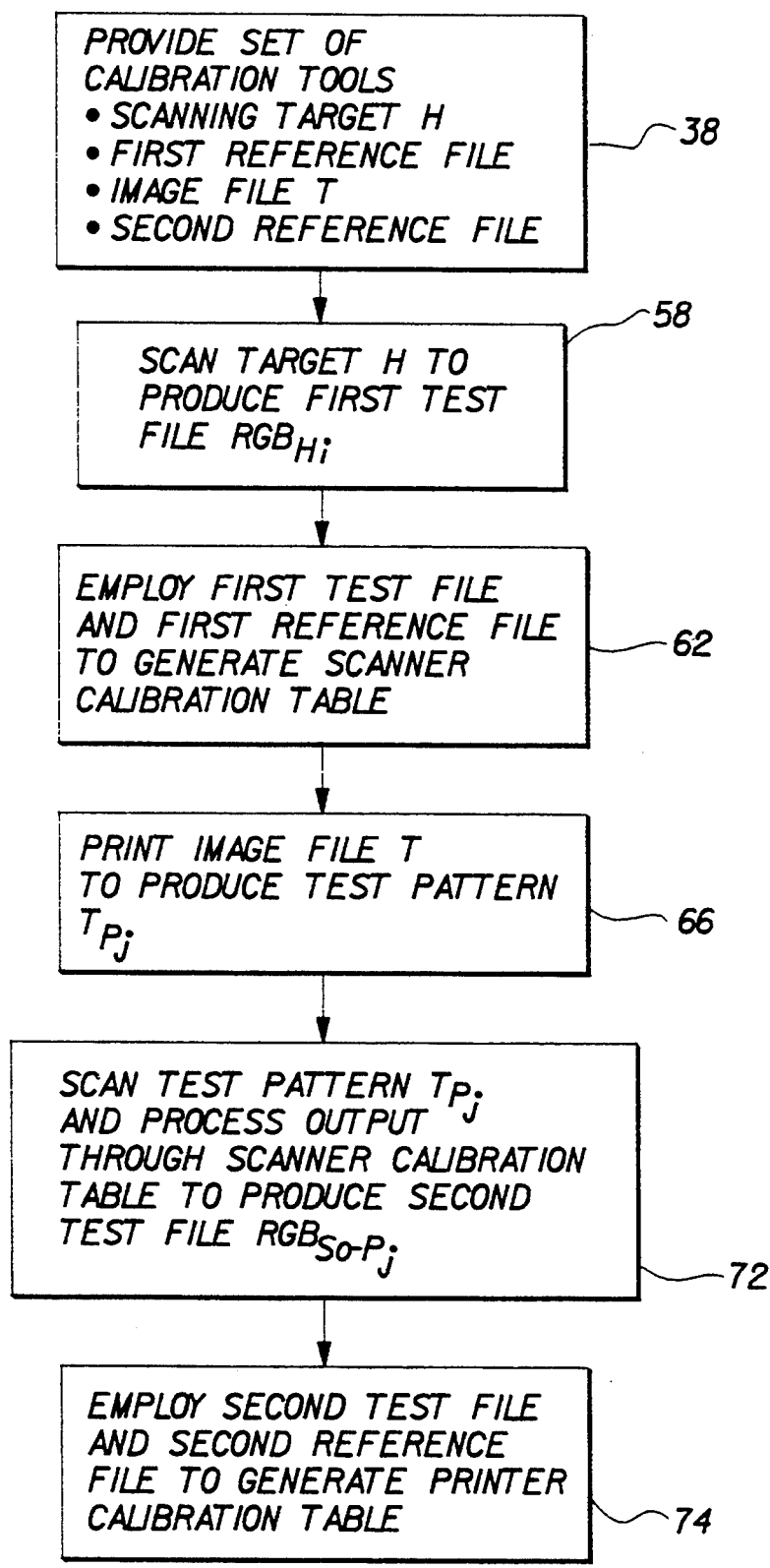
FIG. 3 is a flow chart illustrating the steps of calibrating a color image reproduction system in the field according to the present invention.

Referring now to FIG. 3, the calibration method according to the present invention will be described. First, a set of calibration tools, including a scanning target printed on a first media, a first reference file recording the response of a scanner in a representative system to the scanning target, an image file for producing a test pattern on a printer, and a second reference file recording the response of the scanner to the test pattern from the printer in the representative system are provided (38). The calibration tools are developed on a representative color reproduction system that is set up in the factory and fully calibrated and adjusted using known prior art techniques. FIG. 4 illustrates the representative factory system, where the scanner 22 is labeled $S_0$, the printer 24 is labeled $P_o$, and the 3D-look-up table 40 in the digital image processing computer is labeled $3D$-$LUT_{oo}$. Preferably, the reference scanner $S_o$ and the printer $P_o$ are chosen from a number of scanners and printers to represent the average performance of the color scanners and printers that will be employed in the color image reproduction systems being manufactured. The transform look-up table 40 is developed as is known in the prior art so that the factory reference system performs as desired.

Figure 5:
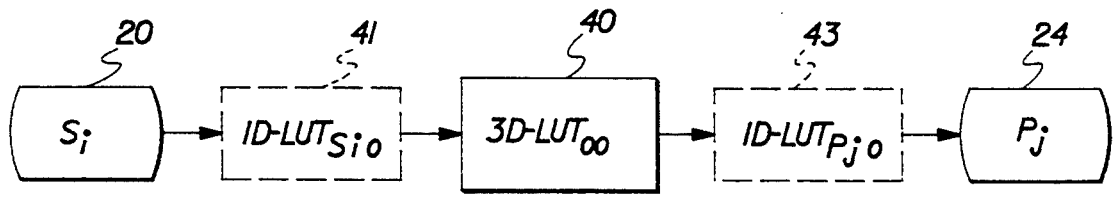
FIG. 5 is a schematic diagram illustrating the architecture of a field calibrated color image reproduction system according to the present invention.

FIG. 5 shows the architecture of a color image reproduction system that is to be calibrated in the field according to the present invention. In this system, the scanner 20 is labeled $S_i$ and the printer 24 is labeled $P_j$. As shown in FIG. 5, the same 3D look-up table 40 (3D-$LUT_{oo}$) is employed in the calibrated system as was developed for the representative factory system shown in FIG. 4. A scanner calibration table (1D-$LUT_{Sio}$) 41 is employed between the scanner 20 ($S_i$) and the 3D look-up table 40 to make the output of the scanner Si resemble the output of the scanner So in the representative system shown in FIG. 4. Similarly, a printer calibration table (1D-$LUT_{Poj}$) 43 is employed between the 3D look-up table 40 and the printer ($P_j$) 24 to cause the printer $P_j$ to respond similarly to the printer $P_o$ in the representative system. The present invention provides a simple operator friendly process for generating these scanner and printer calibration tables 41 and 43.

Figure 6:
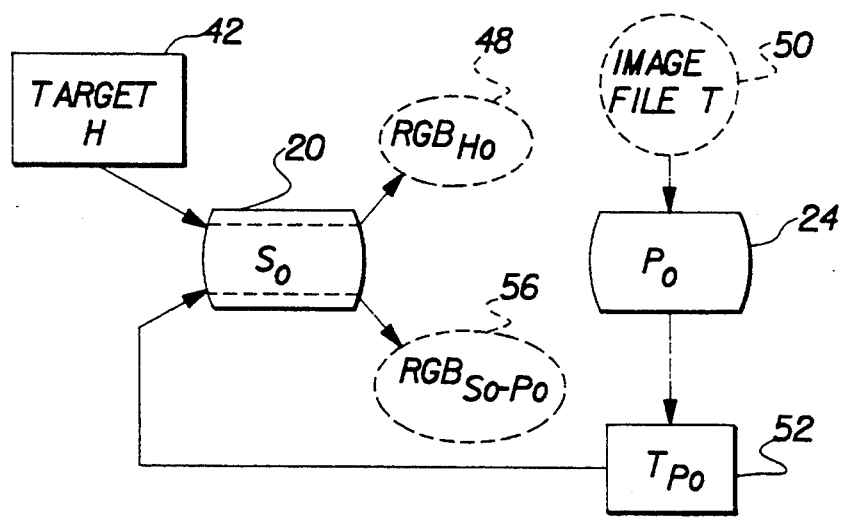
FIG. 6 is a flow chart illustrating the process of producing a set of calibration tools according to the present invention.
Figure 7:
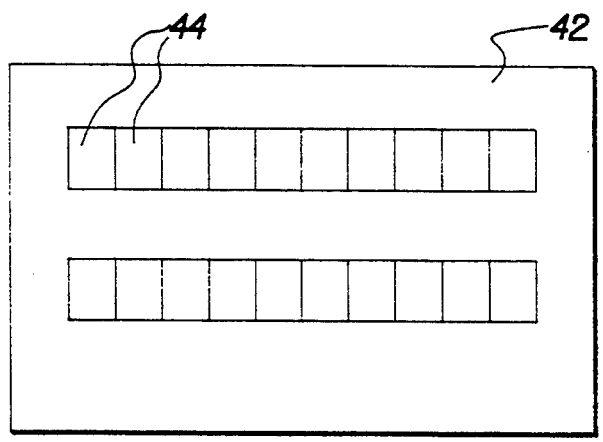
FIG. 7 is a schematic diagram of a scanning target employed in practicing the present invention.

The generation of the calibration tools will now be described. One of the calibration tools is a scanning target H, designated 42 in FIG. 7 that contains a number of neutral density patches 44. In a preferred embodiment, the scanning target H is an array of 20 neutral density patches produced on media that is the input to the color reproduction system (e.g. color photographic paper). Since an identical one of these scanning targets is supplied as a calibration tool with each image reproduction system manufactured, they are preferably all produced at once using the same batch of materials. The scanning target H is used as shown in FIG. 6 to generate a first reference file 48, designated $RGB_{Ho}$, by scanning the target H in the scanner ($S_o$) 20 in the representative factory system. A copy of the first reference file $RGB_{Ho}$ is stored and provided as one of the calibration tools. It may be provided as firm ware in the system computer 22, or as software on a machine readable medium such as a disc.

Figure 8:
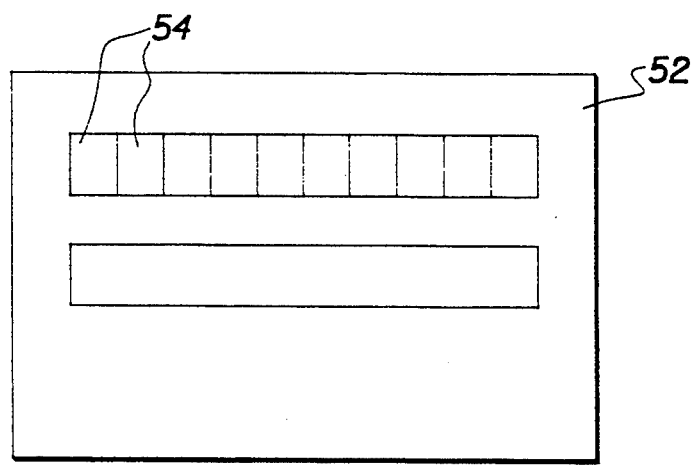
FIG. 8 is a schematic diagram of a test pattern produced in the process of practicing the present invention.

Referring again to FIG. 6, an image file T 50, is provided. The image file is applied to the printer ($P_o$) 24 of the representative factory system to produce a test pattern ($T_{po}$). The test pattern ($T_{Po}$) 52, as shown in FIG. 8 is a set of neutral patches 54, created with a series of equal CMY values in the image file T. Returning to FIG. 6, the test pattern ($T_{Po}$) 52 is then scanned by the scanner ($S_o$) 20 in the representative system to produce a second reference file ($RGB_{So-Po}$) 56. The image file T and the second reference file $RGB_{So-Po}$ are supplied as calibration tools with each image reproduction system that is manufactured. They may be provided as firm ware in the computer 22, or in the form of machine readable media, such as disc.

Figure 9:
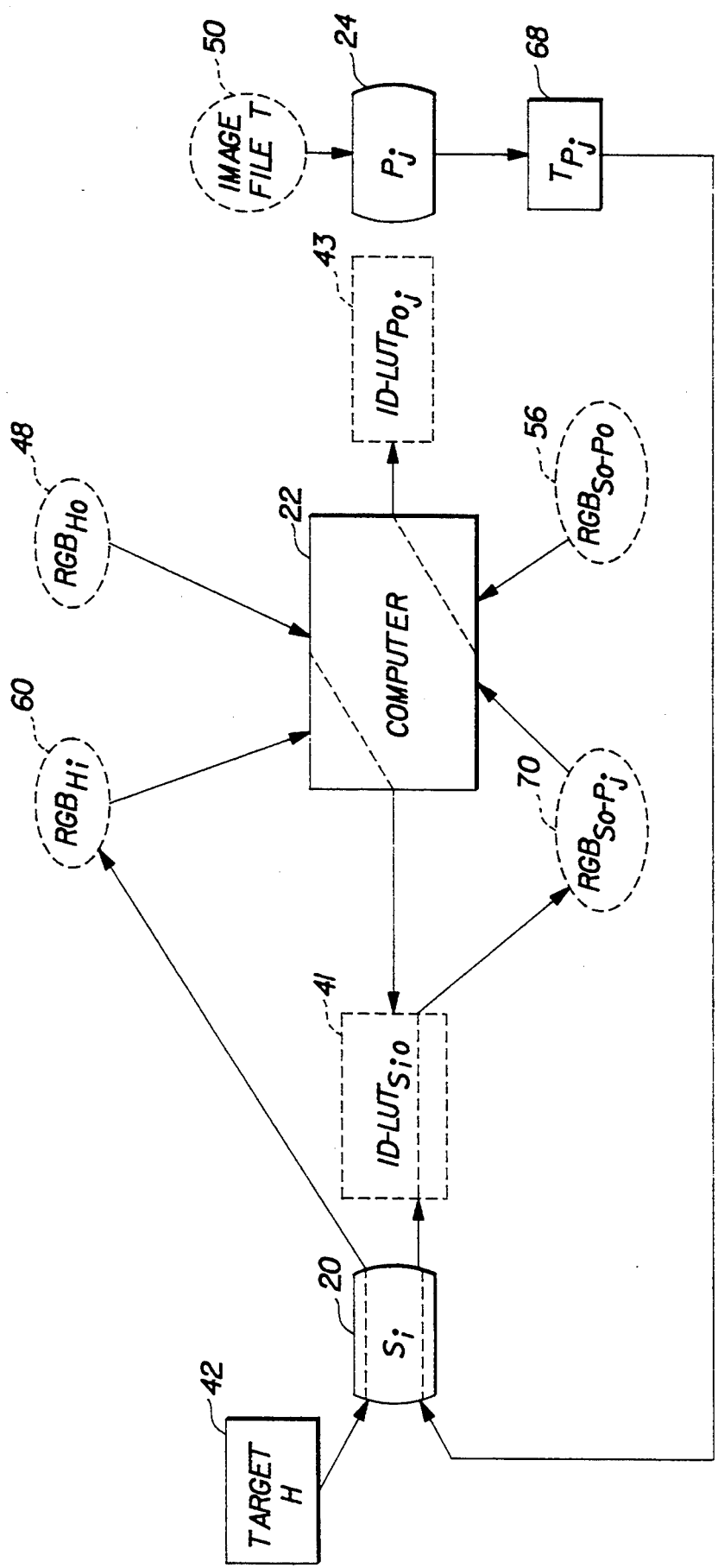
FIG. 9 is a schematic diagram describing the method of calibrating the color reproduction system in the field according to the present invention.

Returning now to FIGS. 3 and 9, the field calibration of a color reproduction system will now be described. To calibrate the color image reproduction system, the operator first scans the scanning target H to produce a first test file ($RGB_{Hi}$) (step 58 in FIG. 3). This process is also shown schematically in FIG. 9, where $S_i$ indicates the scanner 20 of the system being calibrated, Pj indicates the printer 24 of the system being calibrated, and the first test file ($RGB_{Hi}$) is designated 60. Next, the first test file ($RGB_{Hi}$) and first reference file ($RGB_{Ho}$)(which was provided as a calibration tool) are employed to generate a scanner calibration table (step 62 in FIG. 3). The generation of the scanner calibration table (1D $LUT_{Sio}$) 41 is carried out in the digital image processing computer 22 of the system being calibrated using piecewise linear interpolation. The resulting scanner calibration table 41 includes three one dimensional look-up tables, one for each of the colors R,G, and B. The piece-wise linear interpolation procedure for generating the scanner calibration table is outlined in structured programming language in Table I below.

TABLE I

Procedure 1: Creating 1D-LUT$_{Sio}$
Input: RGB$_{Ho}$[3][22], RGB$_{Hi}$[3][22]
Output: 1D-LUT$_{Sio}$[3][256]
BEGIN
    read in RGB$_{Ho}$[3][22], RGB$_{Hi}$[3][22]
    for k = 0 to 2 do begin
        for j = 0 to 255 begin
            find h satisfying: RGB$_{Hi}$[k][h]<=j<=RGB$_{Hi}$[k][h+1]
            ratio = (j-RGB$_{Hi}$[k][h]) / (RGB$_{Hi}$[k][h+1] − RGB$_{Hi}$[k][h])
            1D-LUT$_{So}$[k][j] = RGB$_{Ho}$[k][h] + ratio* (RGB$_{Ho}$[k][h+1] − RGB$_{Ho}$[k][h])
        end
    end
    output 1D-LUT$_{Sio}$[3][256]
END Data in the array RGB$_{Ho}$[3][22] and RGB$_{Hi}$[3][22] represent R,G,B readings for 22 patches. The R,G,B values for the first patch are 0's and for the last patch are 255's. These first and last patches are not actually present on the scanning Target H but are added by the software to facilitate the piece-wise linear interpolation. The other 20 sets of RGB values are the average readings of the 20 neutral patches on Target H as sensed by the scanner $S_o$ and $S_i$.

Next, the image file T is printed (step 66 in FIG. 3) on the printer ($P_j$) 24 of the system being calculated to produce a test pattern ($T_{Pj}$)68. The test pattern ($T_{Pj}$) 68 is then scanned by scanner ($S_i$) 20 and the output of the scanner ($S_i$) 20 is processed through the scanner calibration table (1D-LUT$_{Sio}$) 41 to produce a second test file (RGB$_{So-Pj}$) 70 (step 72 in FIG. 3).

Finally, the second test file (RGB$_{So-Pj}$) 70 and the second reference file (RGB$_{So-Po}$) 56 are employed to generate the printer calibration table (1D-LUT$_{Poj}$) 43 (step 72 in FIG. 3). The printer calibration table (1D-LUT$_{Poj}$) 43 is generated in the computer 22 by piecewise linear interpolation. Table II below lists structured program language for performing the interpolation.

TABLE II

Procedure 2: Creating 1D-LUT$_{Poj}$
Input: RGB$_{So-Po}$[3][20], RGB$_{So-Pj}$[3][20],Pcv[20]
Output: 1D-LUT$_{Poj}$[3][256]
BEGIN
    read in RGB$_{So-Po}$[3][20], RGB$_{So-Pj}$[3][20],Pcv[20]
    for k = 0 to 2 do begin
        for j = 0 to 255 begin
            find h satisfying: Pcv[h]<=j<=Pcv[h+1]
            ratio =(j−Pcv[h]) / (Pcv[h+1] − Pcv[h])
            s=RGB$_{So-Po}$[k][h+1]−ratio * (RGB$_{So-Po}$[k][h]−RGB$_{So-Po}$[k][h+1])
            find h satisfying: RGB$_{So-Pj}$[k][h]=>s=>RGB$_{So-Pj}$[k][h+1])
            ratio = (s − RGB$_{So-Pj}$[k][h+1]) / (RGB$_{So-Pj}$[k][h] − RGB$_{So-Pj}$[k][h+1])
            1D-LUT$_{Poj}$[k][j] = PCV[h+1] − ratio * (Pcv[h+1] − Pcv[h])
        end
    end
    output 1D-LUT$_{Poj}$[3][256]
END Where data in the array RGB$_{So-Po}$[3][20] and RGB$_{So-Pj}$[3][20] represent average RGB readings of the 20 patches on Target T. Data in array Pcv[20] represents the printer C,M,Y code values for printing the 20 patches. The CMY values are set to be equal for the 20 patches. The first value is 255 and the last is 0.

Referring again to FIG. 5, the resulting calibrated color imaging system is shown. The signals from the scanner 20 are first applied to the scanner calibration look-up table (1D-LUT$_{Sio}$) 41 to remove scanner variations. The output from the scanner calibration table 41 is then processed by the standard 3D look-up table 40. Finally, the output from the 3D look-up table (3D-LUT$_{oo}$) 40 is corrected by the printer calibration table (1D-LUT$_{Poj}$) 43 prior to sending it to the printer 24. Using the above described calibration method, variations between one system and another and variations in a system over time are corrected. The method has the further manufacturing advantage that only one representative system needs to be fully calibrated at the factory and after that, all future systems can be calibrated according to the present method.

The invention has been described with reference to a preferred embodiment. However, it will be appreciated that variations and modifications can be effected by a person of ordinary skill in the art without departing from the scope of the invention.

| PARTS LIST | |
|---|---|
| 20 | scanner |
| 22 | digital image processor |
| 24 | printer |
| 26 | prior art look-up table F$_{old}$ |
| 28 | prior art scanning target TP$_{in}$ |
| 30 | prior art test target TP$_{out}$ |
| (32) | prior art transform step |
| (34) | prior art table update step |
| 36 | prior art look-up table F$_{new}$ |
| (38) | provide calibration tools step |
| 40 | 3D look-up table |
| 41 | scanner calibration look-up table 1D-LUT$_{Sio}$ |
| 42 | Target H |
| 43 | printer calibration look-up table 1D-LUT$_{Poj}$ |
| 44 | patch |
| 48 | first reference file |
| 50 | image file T |
| 52 | test pattern T$_{Po}$ |
| 54 | patch |
| 56 | second reference file |
| (58) | scan target H step |
| 60 | first test file |
| (62) | generate scanner calibration table step |
| (66) | produce test pattern step |
| 68 | test pattern T$_{Pj}$ |
| 70 | second test file |
| (72) | produce second test file step |
| (74) | generate printer calibration step |

We claim:

1. A method of calibrating a color image reproduction system in the field, said color image reproduction system having components including a color scanner for generating a color digital image from an input medium, a digital image processor for applying a color transform to the color digital image to produce a transformed color digital image, and a digital color printer for printing the transformed color digital image on an output medium, wherein the input and output media are different, comprising the steps of:

a) providing a set of calibration tools developed on a representative system including a scanning target on a medium that is the same as the input medium, a first reference file recording the response of the scanner in the representative system to the scanning target, an image file for producing a test pattern on a printer, and a second reference file recording the response of the scanner in the representative system to the test pattern produced by the printer in the representative system; and b) employing the calibration tools to calibrate the color image reproduction system, by:
1) scanning said scanning target in the color scanner to produce a first test file;
2) employing said first test file and said first reference file, to generate a scanner calibration table;
3) printing said image file in the color printer on the output medium to produce a test pattern;
4) scanning said test pattern in the color scanner and processing the output of the color scanner through said scanner calibration table to produce a second test file; and
5) employing said second test file and said second reference file to generate a printer calibration table.

2. The method claimed in claim 1, wherein said step of providing said set of calibration tools, comprises the steps of:
a) setting up a representative color image reproduction system to operate in a desired manner, the representative system having components similar to those of the system to be calibrated;
b) providing said scanning target having a set of neutral density patches;
c) scanning the scanning target in the color scanner of the representative system to generate said first reference file;
d) providing said image file for producing a test pattern;
e) printing said image file in the color printer of the representative system to produce a representative test pattern; and
f) scanning said representative test pattern in the color scanner of the representative system to produce said second reference file.

3. The method claimed in claim 1, wherein said scanner calibration table comprises a 1D lookup table to make the output of the scanner in the field resemble the output of the scanner in the representative system, said color transform comprises a 3D lookup table that is the same as a 3D lookup table developed for the representative system and said printer calibration table comprises a 1D lookup table to cause the printer in the field to respond similarly to the printer in the representative system, arranged in series in said image processor.

4. The method claimed in claim 1, wherein said calibration tables are generated by piece-wise linear interpolation.

5. A color image reproduction system comprising:
a) a color input scanner for generating a color digital image from an input medium;
b) a digital image processor for applying a color transform to the color digital image to produce a transformed color digital image;
c) a digital color printer for printing the transformed color digital image on an output medium, wherein the input and output media are different media;
d) a set of calibration tools developed on a representative system including a scanning target on a medium that is the same as the input medium, a first reference file recording the response of a scanner in the representative system to the scanning target, an image file for producing a test pattern, and a second reference file recording the response of the scanner in the representative system to the test pattern produced by the printer in the representative system; and
e) means for employing the calibration tools to calibrate the color image reproduction system, including:
1) means for scanning said scanning target in the color scanner to produce a first test file;
2) means employing said first test file and said first reference file, for generating a scanner calibration table;
3) means for sending said image file to the printer to produce a test pattern on the output medium;
4) means for scanning said test pattern in the color scanner and processing the output of the color scanner through said calibration table to produce a second test file; and
5) means employing said second test file and said second reference file for generating a printer calibration table.

* * * * *